US008335745B2

(12) United States Patent
Perlman et al.

(10) Patent No.: US 8,335,745 B2
(45) Date of Patent: Dec. 18, 2012

(54) METHOD AND SYSTEM FOR PROCESSING MICROPAYMENT TRANSACTIONS

(75) Inventors: Jeffrey W. Perlman, Lindfield (AU);
Michael J. Kearney, Carindale (AU);
Timothy M. Lee, San Jose, CA (US);
Gregory Storey, Caringbah (AU)

(73) Assignee: Visa International Service Association, Foster City, CA (US)

( * ) Notice: Subject to any disclaimer, the term of this patent is extended or adjusted under 35 U.S.C. 154(b) by 719 days.

(21) Appl. No.: 11/870,799

(22) Filed: Oct. 11, 2007

(65) Prior Publication Data
US 2008/0091619 A1  Apr. 17, 2008

Related U.S. Application Data

(60) Provisional application No. 60/829,057, filed on Oct. 11, 2006.

(51) Int. Cl.
*G06Q 20/00* (2012.01)
(52) U.S. Cl. .............. 705/67; 705/64; 705/75; 705/77; 705/78
(58) Field of Classification Search .............. 705/65, 705/64, 77, 67
See application file for complete search history.

(56) References Cited

U.S. PATENT DOCUMENTS

| | | | |
|---|---|---|---|
| 3,652,795 A | 3/1972 | Wolf et al. | |
| 4,321,672 A | 3/1982 | Braun et al. | |
| 4,341,951 A | 7/1982 | Benton | |
| 4,454,414 A | 6/1984 | Benton | |
| 4,645,873 A | 2/1987 | Chomet | |
| 4,713,761 A | 12/1987 | Sharpe et al. | |
| 4,750,119 A | 6/1988 | Cohen et al. | |
| 4,823,264 A | 4/1989 | Deming | |
| RE32,985 E | 7/1989 | Nagata et al. | |
| 4,866,611 A | 9/1989 | Cree et al. | |
| 4,941,090 A | 7/1990 | McCarthy | |
| 5,010,485 A | 4/1991 | Bigari | |
| 5,025,372 A | 6/1991 | Burton et al. | |
| 5,132,521 A | 7/1992 | Smith et al. | |
| 5,220,501 A | 6/1993 | Lawlor et al. | |
| 5,231,571 A | 7/1993 | D'Agostino | |
| 5,326,960 A | 7/1994 | Tannenbaum | |

(Continued)

FOREIGN PATENT DOCUMENTS
AU   640855   9/1993
(Continued)

OTHER PUBLICATIONS

White, Ron, "How Computers Work", Millennium Ed., Que Corporation, Indianapolis, IN, 1999.*

(Continued)

*Primary Examiner* — Chrystina Zelaskiewicz
(74) *Attorney, Agent, or Firm* — Jones Day

(57) ABSTRACT

Methods and systems for performing micropayment transactions over communication networks is provided. These methods and systems enable ubiquitous micropayments by providing a seamless payment solution in which micropayment is one of a plurality of payments facilitated. In an embodiment, the transaction value may be compared to a predefined threshold, and processed as a micropayment if said value is less than said threshold, and otherwise processed using a second processing system. In another embodiment, the transaction may be processed as a micropayment if the payee has previously been verified by the micropayment processing system. In a third embodiment, the transaction takes place using the payee's website.

13 Claims, 5 Drawing Sheets

U.S. PATENT DOCUMENTS

| | | | |
|---|---|---|---|
| 5,329,589 A | 7/1994 | Fraser et al. |
| 5,350,906 A | 9/1994 | Brody et al. |
| 5,351,296 A | 9/1994 | Sullivan |
| 5,383,113 A | 1/1995 | Kight et al. |
| 5,412,730 A | 5/1995 | Jones |
| 5,440,634 A | 8/1995 | Jones et al. |
| 5,450,537 A | 9/1995 | Hirai et al. |
| 5,453,601 A | 9/1995 | Rosen |
| 5,455,407 A | 10/1995 | Rosen |
| 5,537,314 A | 7/1996 | Kanter |
| 5,557,516 A | 9/1996 | Hogan |
| 5,581,764 A | 12/1996 | Fitzgerald et al. |
| 5,623,547 A | 4/1997 | Jones et al. |
| 5,640,577 A | 6/1997 | Scharmer |
| 5,659,165 A | 8/1997 | Jennings et al. |
| 5,692,132 A | 11/1997 | Hogan |
| 5,699,528 A | 12/1997 | Hogan |
| 5,717,989 A | 2/1998 | Tozzoli et al. |
| 5,742,845 A | 4/1998 | Wagner |
| 5,745,574 A | 4/1998 | Muftic |
| 5,790,790 A | 8/1998 | Smith et al. |
| 5,793,302 A | 8/1998 | Stambler |
| 5,794,259 A | 8/1998 | Kikinis |
| 5,799,087 A | 8/1998 | Rosen |
| 5,815,657 A | 9/1998 | Williams et al. |
| 5,832,463 A | 11/1998 | Funk |
| 5,850,442 A | 12/1998 | Muftic |
| 5,862,325 A | 1/1999 | Reed et al. |
| 5,873,072 A | 2/1999 | Kight et al. |
| 5,884,288 A | 3/1999 | Chang et al. |
| 5,884,312 A | 3/1999 | Dustan et al. |
| 5,890,140 A | 3/1999 | Clark et al. |
| 5,893,120 A | 4/1999 | Nemes |
| 5,903,881 A | 5/1999 | Schrader et al. |
| 5,920,629 A | 7/1999 | Rosen |
| 5,946,667 A | 8/1999 | Tull et al. |
| 5,953,423 A | 9/1999 | Rosen |
| 5,956,391 A | 9/1999 | Melen et al. |
| 5,956,700 A | 9/1999 | Landry |
| 5,960,411 A | 9/1999 | Hartman et al. |
| 5,963,647 A | 10/1999 | Downing et al. |
| 5,966,696 A | 10/1999 | Giraud |
| 5,966,698 A | 10/1999 | Pollin |
| 5,974,148 A | 10/1999 | Stambler |
| 5,974,430 A | 10/1999 | Mutschler, III et al. |
| 6,012,041 A | 1/2000 | Brewer et al. |
| 6,012,044 A | 1/2000 | Maggioncalda et al. |
| 6,012,045 A | 1/2000 | Barzilai et al. |
| 6,012,048 A | 1/2000 | Gustin et al. |
| 6,029,150 A | 2/2000 | Kravitz |
| 6,032,133 A | 2/2000 | Hilt et al. |
| 6,067,621 A | 5/2000 | Yu et al. |
| 6,088,717 A | 7/2000 | Reed et al. |
| 6,092,053 A | 7/2000 | Boesch et al. |
| 6,138,107 A | 10/2000 | Elgamal |
| 6,173,272 B1 | 1/2001 | Thomas et al. |
| 6,192,407 B1 | 2/2001 | Smith et al. |
| 6,226,624 B1 | 5/2001 | Watson et al. |
| 6,227,447 B1 | 5/2001 | Campisano |
| 6,289,322 B1 | 9/2001 | Kitchen et al. |
| 6,327,578 B1 | 12/2001 | Linehan |
| 6,330,550 B1 | 12/2001 | Brisebois et al. |
| 6,332,134 B1 | 12/2001 | Foster |
| 6,341,724 B2 | 1/2002 | Campisano |
| 6,351,739 B1 | 2/2002 | Egendorf |
| 6,360,205 B1 | 3/2002 | Iyengar et al. |
| 6,421,729 B1 | 7/2002 | Paltenghe et al. |
| 6,424,249 B1 | 7/2002 | Houvener |
| 6,467,684 B2 | 10/2002 | Fite et al. |
| 6,487,599 B1 | 11/2002 | Smith et al. |
| 6,490,601 B1 | 12/2002 | Markus et al. |
| 6,499,042 B1 | 12/2002 | Markus |
| 6,547,129 B2 | 4/2003 | Nichols et al. |
| 6,609,113 B1 | 8/2003 | O'Leary et al. |
| 6,748,367 B1 | 6/2004 | Lee |
| 6,757,710 B2 | 6/2004 | Reed |
| 6,850,996 B2 | 2/2005 | Wagner |
| 6,871,288 B2 | 3/2005 | Russikoff |
| 6,873,974 B1 | 3/2005 | Schutzer |
| 6,907,476 B2 | 6/2005 | Wagner |
| 6,915,271 B1 | 7/2005 | Meyer et al. |
| 6,932,268 B1 | 8/2005 | McCoy et al. |
| 6,963,843 B1 | 11/2005 | Takatsu et al. |
| 7,006,993 B1 | 2/2006 | Cheong et al. |
| 7,062,706 B2 | 6/2006 | Maxwell et al. |
| 7,089,208 B1 | 8/2006 | Levchin et al. |
| 7,092,913 B2 | 8/2006 | Cannon, Jr. |
| 7,099,850 B1 | 8/2006 | Mann, II et al. |
| 7,103,571 B2 | 9/2006 | Shigemi et al. |
| 7,127,427 B1 | 10/2006 | Casper |
| 7,159,180 B2 | 1/2007 | Ward |
| 7,175,074 B2 | 2/2007 | Mejias et al. |
| 7,177,838 B1 | 2/2007 | Ling |
| 7,216,292 B1 | 5/2007 | Snapper et al. |
| 7,231,372 B1 | 6/2007 | Prange et al. |
| 7,249,097 B2 | 7/2007 | Hutchison et al. |
| 7,249,099 B2 | 7/2007 | Ling |
| 7,251,656 B2 | 7/2007 | Keown et al. |
| 7,254,569 B2 | 8/2007 | Goodman et al. |
| 7,257,581 B1 | 8/2007 | Steele et al. |
| 7,260,724 B1 | 8/2007 | Dickinson et al. |
| 7,324,972 B1 | 1/2008 | Oliver et al. |
| 7,328,189 B2 | 2/2008 | Ling |
| 7,334,184 B1 | 2/2008 | Simons |
| 7,337,144 B1 | 2/2008 | Blinn et al. |
| 7,337,953 B2 | 3/2008 | Sgambati et al. |
| 7,343,351 B1 | 3/2008 | Bishop et al. |
| 7,346,577 B1 | 3/2008 | Williams et al. |
| 7,346,587 B2 | 3/2008 | Goldstein et al. |
| 7,347,361 B2 | 3/2008 | Lovett |
| 7,350,139 B1 | 3/2008 | Simons |
| RE40,220 E | 4/2008 | Nichols et al. |
| 7,366,702 B2 | 4/2008 | David |
| 7,366,703 B2 | 4/2008 | Gray et al. |
| 7,376,621 B1 | 5/2008 | Ling |
| 7,379,919 B2 | 5/2008 | Hogan et al. |
| 7,392,536 B2 | 6/2008 | Jamieson et al. |
| 7,395,241 B1 | 7/2008 | Cook et al. |
| 7,412,420 B2 | 8/2008 | Holdsworth |
| 7,415,443 B2 | 8/2008 | Hobson et al. |
| 7,426,530 B1 | 9/2008 | Rosko et al. |
| 7,437,327 B2 | 10/2008 | Lam et al. |
| 7,437,757 B2 | 10/2008 | Holdsworth |
| 7,444,672 B2 | 10/2008 | Ellmore |
| 7,447,662 B2 | 11/2008 | Gibson |
| 7,458,507 B2 | 12/2008 | Fillinger et al. |
| 7,461,028 B2 | 12/2008 | Wronski, Jr. |
| 7,461,265 B2 | 12/2008 | Ellmore |
| 7,461,776 B2 | 12/2008 | Steiger, Jr. |
| 7,463,946 B2 | 12/2008 | Smith et al. |
| 7,471,818 B1 | 12/2008 | Price et al. |
| 7,472,171 B2 | 12/2008 | Miller et al. |
| 7,483,845 B2 | 1/2009 | Vetelainen |
| 7,487,127 B2 | 2/2009 | Weichert et al. |
| 7,496,952 B2 | 2/2009 | Edwards, Jr. et al. |
| 7,500,606 B2 | 3/2009 | Park et al. |
| 7,502,833 B2 | 3/2009 | Schaeck |
| 7,512,552 B2 | 3/2009 | Karas et al. |
| 7,519,560 B2 | 4/2009 | Lam et al. |
| 7,523,182 B2 | 4/2009 | Godwin |
| 7,533,063 B2 | 5/2009 | Kianian |
| 7,533,064 B1 | 5/2009 | Boesch |
| 7,533,828 B2 | 5/2009 | Ong |
| 7,536,354 B1 | 5/2009 | deGroeve et al. |
| 7,540,408 B2 | 6/2009 | Levine et al. |
| 7,543,738 B1 | 6/2009 | Saunders et al. |
| 7,546,272 B2 | 6/2009 | Loy |
| 7,546,275 B1 | 6/2009 | Herzberg et al. |
| 7,548,988 B2 | 6/2009 | Philyaw et al. |
| 7,552,467 B2 | 6/2009 | Lindsay |
| 7,568,631 B2 | 8/2009 | Gibbs et al. |
| 7,571,140 B2 | 8/2009 | Weichert et al. |
| 7,577,599 B2 | 8/2009 | Sanchez et al. |
| 7,580,857 B2 | 8/2009 | VanFleet et al. |
| 7,580,898 B2 | 8/2009 | Brown et al. |
| 7,581,257 B1 | 8/2009 | O'Hara |
| 7,584,153 B2 | 9/2009 | Brown et al. |

| | | |
|---|---|---|
| 7,590,595 B2 | 9/2009 | Pessin |
| 7,606,760 B2 | 10/2009 | Hutchison et al. |
| 7,610,233 B1 | 10/2009 | Leong et al. |
| 7,627,523 B1 | 12/2009 | Symonds et al. |
| 7,627,531 B2 | 12/2009 | Breck et al. |
| 7,657,531 B2 | 2/2010 | Bisbee et al. |
| 7,660,779 B2 | 2/2010 | Goodman et al. |
| 7,664,699 B1 | 2/2010 | Powell |
| 7,680,679 B1 | 3/2010 | Patricelli et al. |
| 7,694,135 B2 | 4/2010 | Rowan et al. |
| 7,698,221 B2 | 4/2010 | Blinn et al. |
| 7,702,580 B1 | 4/2010 | Voth et al. |
| 7,707,105 B2 | 4/2010 | O'Neil |
| 7,711,621 B2 | 5/2010 | Huang et al. |
| 7,716,596 B2 | 5/2010 | Cao et al. |
| 7,729,925 B2 | 6/2010 | Maritzen et al. |
| 7,761,374 B2 | 7/2010 | Sahota et al. |
| 2001/0014878 A1 | 8/2001 | Mitra et al. |
| 2001/0032182 A1 | 10/2001 | Kumar et al. |
| 2001/0039535 A1 | 11/2001 | Tsiounis et al. |
| 2001/0054148 A1 | 12/2001 | Hoornaert et al. |
| 2001/0056405 A1 | 12/2001 | Muyres et al. |
| 2002/0002495 A1 | 1/2002 | Ullman |
| 2002/0004772 A1 | 1/2002 | Templeton et al. |
| 2002/0016769 A1 | 2/2002 | Barbara et al. |
| 2002/0046341 A1 | 4/2002 | Kazaks et al. |
| 2002/0052841 A1 | 5/2002 | Guthrie et al. |
| 2002/0059141 A1 | 5/2002 | Davies et al. |
| 2002/0073027 A1 | 6/2002 | Hui et al. |
| 2002/0083011 A1 | 6/2002 | Kobayashi |
| 2002/0120582 A1 | 8/2002 | Elston et al. |
| 2002/0184147 A1 | 12/2002 | Boulger |
| 2003/0014633 A1 | 1/2003 | Gruber |
| 2003/0061111 A1* | 3/2003 | Dutta et al. ............. 705/26 |
| 2003/0074328 A1 | 4/2003 | Schiff et al. |
| 2003/0097331 A1 | 5/2003 | Cohen |
| 2003/0101134 A1 | 5/2003 | Liu et al. |
| 2003/0101137 A1 | 5/2003 | Wronski, Jr. |
| 2003/0110136 A1 | 6/2003 | Wells et al. |
| 2003/0135434 A1* | 7/2003 | Jain ................... 705/34 |
| 2003/0183689 A1 | 10/2003 | Swift et al. |
| 2003/0197061 A1 | 10/2003 | Din |
| 2003/0212642 A1 | 11/2003 | Weller et al. |
| 2003/0233334 A1 | 12/2003 | Smith |
| 2004/0029569 A1 | 2/2004 | Khan et al. |
| 2004/0039694 A1 | 2/2004 | Dunn et al. |
| 2004/0044621 A1 | 3/2004 | Huang et al. |
| 2004/0093303 A1 | 5/2004 | Picciallo |
| 2004/0103057 A1 | 5/2004 | Melbert et al. |
| 2004/0118914 A1 | 6/2004 | Smith et al. |
| 2004/0122770 A1 | 6/2004 | Craig et al. |
| 2004/0128508 A1 | 7/2004 | Wheeler et al. |
| 2004/0236692 A1 | 11/2004 | Sellen et al. |
| 2005/0005094 A1 | 1/2005 | Jamieson et al. |
| 2005/0086169 A1 | 4/2005 | Wells et al. |
| 2005/0097049 A1 | 5/2005 | Writer et al. |
| 2005/0131816 A1 | 6/2005 | Britto et al. |
| 2005/0147225 A1 | 7/2005 | Mallick et al. |
| 2005/0149455 A1 | 7/2005 | Bruesewitz et al. |
| 2005/0199709 A1 | 9/2005 | Linlor |
| 2005/0211763 A1 | 9/2005 | Sgambati et al. |
| 2006/0080238 A1* | 4/2006 | Nielsen et al. ............ 705/40 |
| 2006/0089906 A1 | 4/2006 | Rowley |
| 2006/0131390 A1 | 6/2006 | Kim |
| 2006/0143122 A1 | 6/2006 | Sines et al. |
| 2006/0143690 A1* | 6/2006 | Lin et al. ............ 726/2 |
| 2006/0149671 A1* | 7/2006 | Nix et al. ............ 705/40 |
| 2006/0190300 A1 | 8/2006 | Drucker |
| 2006/0230265 A1 | 10/2006 | Krishna |
| 2006/0294005 A1 | 12/2006 | Drepak |
| 2007/0011093 A1* | 1/2007 | Tree ............ 705/40 |
| 2007/0136211 A1 | 6/2007 | Brown et al. |
| 2007/0198432 A1 | 8/2007 | Pitroda et al. |
| 2007/0214259 A1 | 9/2007 | Ahmed et al. |
| 2007/0255662 A1 | 11/2007 | Tumminaro |
| 2007/0260536 A1 | 11/2007 | Stone |
| 2007/0276944 A1 | 11/2007 | Samovar et al. |
| 2007/0291741 A1 | 12/2007 | Hwang |
| 2008/0015985 A1 | 1/2008 | Abhari et al. |
| 2008/0091600 A1* | 4/2008 | Egnatios et al. ............ 705/42 |
| 2008/0091619 A1 | 4/2008 | Perlman et al. |
| 2008/0110983 A1 | 5/2008 | Ashfield |
| 2008/0162295 A1 | 7/2008 | Bedier |
| 2008/0177796 A1 | 7/2008 | Eldering |
| 2008/0201769 A1 | 8/2008 | Finn |
| 2008/0208762 A1 | 8/2008 | Arthur et al. |
| 2008/0228653 A1 | 9/2008 | Holdsworth |
| 2008/0288405 A1 | 11/2008 | John |
| 2008/0289022 A1 | 11/2008 | Chiu |
| 2008/0306877 A1 | 12/2008 | Mandeles et al. |
| 2009/0006646 A1 | 1/2009 | Duarte |
| 2009/0063345 A1 | 3/2009 | Erikson |
| 2009/0094148 A1 | 4/2009 | Gilder et al. |
| 2009/0121016 A1 | 5/2009 | Hammad et al. |
| 2009/0150265 A1 | 6/2009 | Keld |
| 2009/0157531 A1 | 6/2009 | Bui |
| 2009/0171778 A1 | 7/2009 | Powell |
| 2009/0171844 A1 | 7/2009 | Olliphant et al. |
| 2009/0173782 A1 | 7/2009 | Muscato |
| 2009/0182674 A1 | 7/2009 | Patel et al. |
| 2009/0182675 A1 | 7/2009 | Brody |
| 2009/0210347 A1 | 8/2009 | Sarcanin |
| 2009/0216676 A1 | 8/2009 | Mathur et al. |
| 2009/0259547 A1 | 10/2009 | Clopp |
| 2010/0318801 A1 | 12/2010 | Roberge et al. |

FOREIGN PATENT DOCUMENTS

| | | |
|---|---|---|
| WO | 9613814 | 5/1996 |
| WO | 2002005224 | 1/2002 |
| WO | 02/079922 A2 | 10/2002 |

OTHER PUBLICATIONS

International Search Report of PCT Application No. PCT/US2001/021725, Aug. 29, 2002, 2 pages.
PCT International Search Report for PCT/US07/81124 dated Sep. 5, 2008
Ramachandran, Mani, Jul. 13, 2010 Office Action from Australian Patent Application No. 2007307688 [2 pp.].
Posting Payments, http://msdn.microsoft.com/en-us/library/aa480428(v=MSDN.10).aspx, 1998 (MSDN).
Report of the Auditor General of Canada, Apr. 2003 Report—Chapter 2 (Post Pay).
EPO: Extended European search report issued May 4, 2011 for Application No. 07853964.0 (4 pages).
English Summary of Japanese Office Action for corresponding JP Application 2009-532582 dated Sep. 18, 2012 (6 pages).

* cited by examiner

METHOD AND SYSTEM FOR PROCESSING MICROPAYMENT TRANSACTIONS

CROSS REFERENCE TO RELATED APPLICATIONS

This application claims the priority of provisional application No. 60/829,057, filed Oct. 11, 2006.

BACKGROUND OF THE INVENTION

As use of the Internet continues to expand, a fundamental change has occurred in the digital content marketplace. For example, the music industry has adopted a new digital form factor used by MP3 players and other digital music players. Pricing schemes for such content, buying behavior and the business model and priorities for the industry have drastically changed as a result of the digital music revolution. For example, digital music can often be purchased via the Internet on an individual song basis, where each song may cost approximately one dollar.

Other industries are likewise re-evaluating future models in order to satisfy consumers and their anticipated purchasing behaviors. For example, software companies are evaluating new and more dynamic ways to package, distribute and price software, such as via the Internet. In many cases, using the Internet to distribute software to purchase subscriptions to Internet websites and the like will result in an increase in micropayment transactions (transactions having payments under approximately $5). It is projected that 30 billion micropayment transactions will take place globally by 2010.

One problem with micropayment transactions is that the cost of obtaining payment from the user is high with respect to the purchase price. Current methods of obtaining payment include 1) repeated, single instance payments, 2) aggregating payments, 3) proprietary pre-paid accounts and 4) proprietary payment processing systems.

Repeated, single instance payments occur when, for example, a credit card is charged once for each micropayment transaction. Acquirers cannot viably provide such a service to merchants because the cost of processing a transaction is too high relative to the transaction amount and standard fee structures. On the other hand, consumers are required to present too much data (i.e., full card details) relative to the size of the payment. Moreover, consumers can have concern regarding control over their data.

Some merchants aggregate payments in an attempt to overcome these deficiencies. However, payment aggregation does not lessen the cost of processing transactions for all consumers. While the per transaction cost of high-volume consumers is reduced, a low-volume consumer might only make one or two transactions within a billing period. As such, standard fee structures still make the cost of processing transactions for low-volume consumers prohibitive for the acquirer. In addition, payment aggregation causes the merchant to bear an increased risk for unprocessed transactions. For example, a consumer might only purchase a single item, but the merchant would not process the transaction until the end of the billing period, by which time the consumer's payment card may have exceeded its limit or have been compromised. The consumer can also lose granularity in his transaction statement because all transactions are aggregated into a single transaction.

Proprietary pre-paid accounts are used for some pay-for-use services. Such accounts are typically used on a per-merchant basis. As such, the services are not generally compatible across business and/or geographic boundaries. Proprietary pre-paid accounts also require consumers to manage separate accounts for each merchant with which they are working and dedicate cash resources to each account.

Proprietary payment processing systems, in which each merchant's contract with a third party system to process payments, disadvantage consumers in substantially the same way as proprietary pre-paid accounts. In addition, merchants are required to make significant investments in infrastructure in order to develop such systems.

It would be desirable to have methods and systems for enabling ubiquitous micropayments in order to expand online purchasing opportunities for merchants and consumers while also being commercially viable for the facilitating entities, e.g. issuers and acquirers.

The present disclosure is directed to solving or overcoming one or more of the problems described above in the context of a broader, seamless payment solution in which micropayment is one of a plurality of payments facilitated. As such, much of the distinct functionality of the described methods and systems also has unique value to a broader range of payment types.

SUMMARY OF PREFERRED EMBODIMENTS

Before the present methods are described, it is to be understood that this invention is not limited to the particular methodologies or protocols described, as these may vary. It is also to be understood that the terminology used herein is for the purpose of describing particular embodiments only, and is not intended to limit the scope of the present disclosure, which will be limited only by the appended claims.

It must be noted that as used herein and in the appended claims, the singular forms "a," "an," and "the" include plural reference unless the context clearly dictates otherwise. Thus, for example, reference to a "transaction" is a reference to one or more transactions and equivalents thereof known to those skilled in the art, and so forth. Unless defined otherwise, all technical and scientific terms used herein have the same meanings as commonly understood by one of ordinary skill in the art. Although any methods and materials similar or equivalent to those described herein can be used in the practice or testing of the present invention, the preferred methods, devices, and materials are now described. All publications mentioned herein are incorporated herein by reference. Nothing herein is to be construed as an admission that the invention is not entitled to antedate such disclosure by virtue of prior invention.

In an embodiment, a method of processing a micropayment transaction may include receiving a request for access to an item and a payer identifier from a payee website, requesting and verifying the payer password, determining whether one or more pre-defined account parameters pertaining to an account associated with the payer identifier are satisfied, if so, determining whether a required value for accessing the item is less than a pre-defined threshold, if so, determining whether an account associated with the payer identifier contains funds greater than or equal to the required value, and if so, permitting access to the item.

In an embodiment, a method of processing a transaction may include receiving a transaction value for a transaction, comparing the transaction value with a predefined threshold, processing the transaction using a first payment processing system if the transaction value is less than the predefined threshold, and processing the transaction using a second payment processing system if the transaction value is greater than the predefined threshold. The first payment processing system may include a micropayment processing system.

In an embodiment, a method of processing a transaction may include receiving information pertaining to a transaction, determining whether a payee has been previously verified by the micropayment processing system within a defined set of parameters, and, if so, processing the transaction without receiving payer-identifying information from the payer at the time of the current transaction.

In an embodiment, a method of processing a transaction may include receiving information pertaining to a transaction from the payee, information originally generated by the micropayment processing system and stored by the payee pertaining to the validity of the payer registration with the system, and verification of the payer's identity from the payer, and, if so, processing the transaction without receiving any payer-identifying information directly from the payer.

BRIEF DESCRIPTION OF THE DRAWINGS

Aspects, features, benefits and advantages of the present invention will be apparent with regard to the following description and accompanying drawings, of which.

DETAILED DESCRIPTION OF PREFERRED EMBODIMENTS

A payer is an entity that engages in a value transfer, such as an individual or a small business. The payer participates in a transaction with a payee, usually by purchasing a good or service from the payee and/or by exchanging items, services or other value with the payee.

A payee is a second entity that engages in a value transfer. A payee participates in a transaction with a payer, usually by providing a good or service to the payer in exchange for value and/or by exchanging items, services or other value with the payer.

A transaction is a flow of value between entities, such as a payer and a payee.

A micropayment transaction is a transaction in which the value to be transferred is less than a threshold value, such as, for example and without limitation, approximately five dollars.

Figure 1:
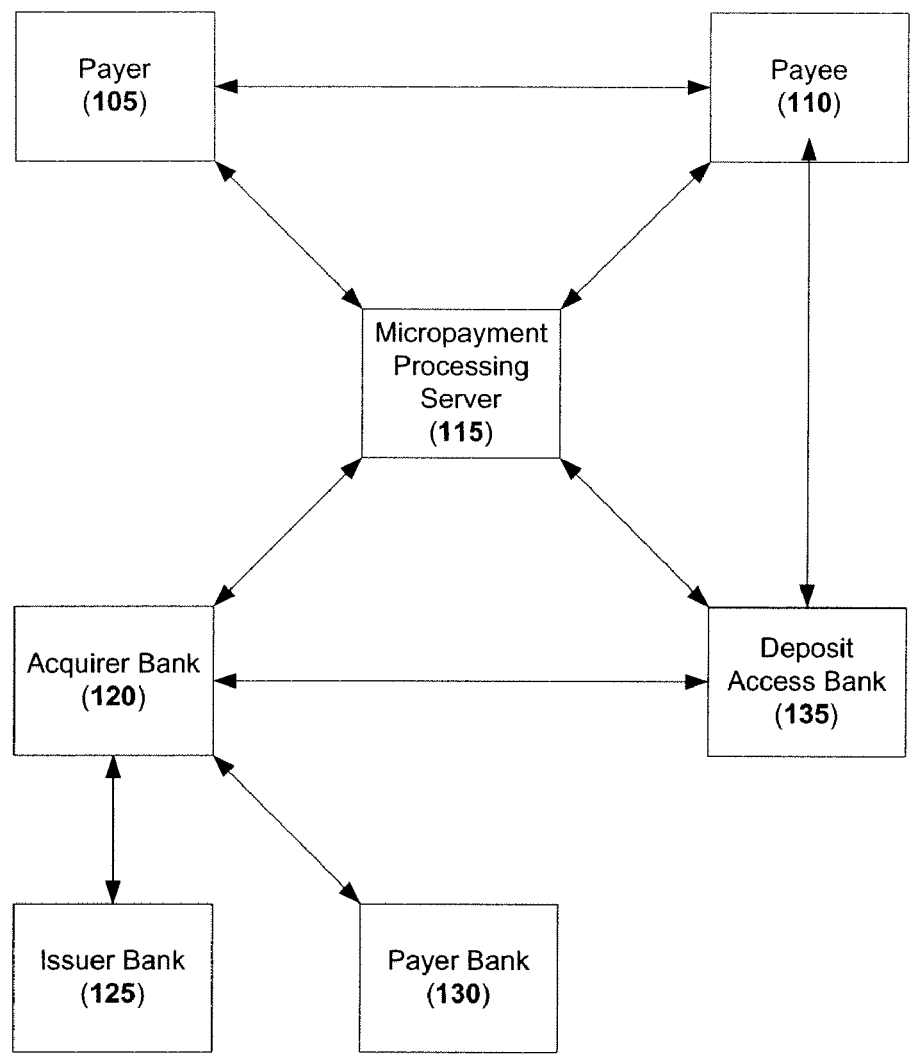
FIG. 1 depicts a dataflow diagram for exemplary participants in a micropayment transaction according to an embodiment.

FIG. 1 depicts a dataflow diagram for exemplary participants in a micropayment transaction according to an embodiment. As shown in FIG. 1, the micropayment transaction processing system may include a payer 105, a payee 110, a micropayment processing server 115, an acquirer bank 120, an issuer bank 125, a payer bank 130, and a deposit access bank 135 to manage the float of value in the system. Exemplary communications between two parties are depicted by the lines in FIG. 1 and are described in more detail below in reference to FIGS. 2 and 3. Communicating parties may communicate with each other via, for example, the Internet, and intranet and/or any other data network. Other communication methods, such as a telephone, a PDA, a Blackberry, a gaming console, an interactive kiosk and the like may also be used within the scope of the present disclosure.

Figure 2:
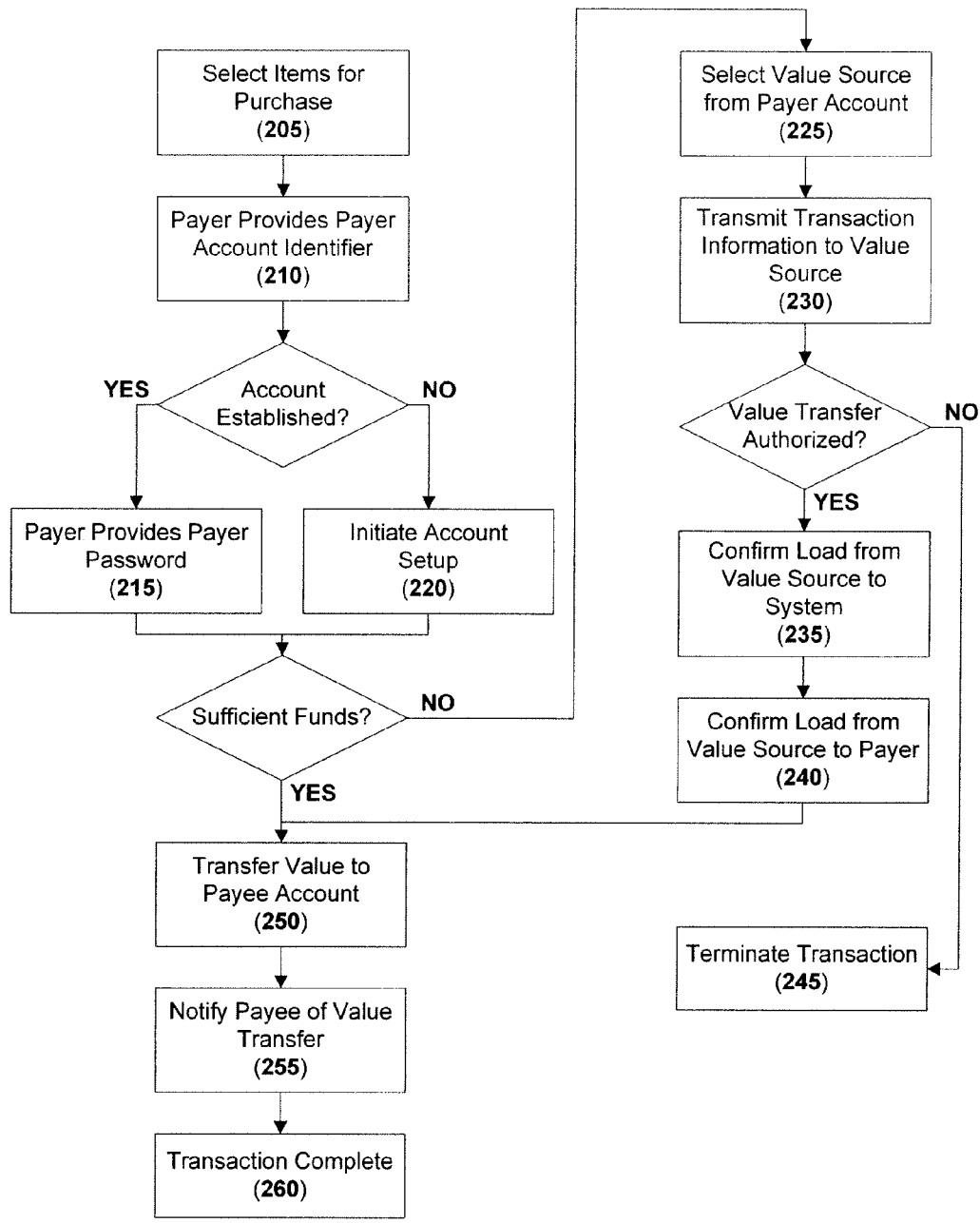
FIG. 2 depicts a flow diagram for an exemplary process of processing a micropayment transaction according to an embodiment.

FIG. 2 depicts a flow diagram for an exemplary process of processing a micropayment according to an embodiment. As shown in FIG. 2, a payer 105 may shop at an online payee 110 and, for example, select 205 one or more goods and/or services for purchase from the payee. If the transaction is a micropayment transaction, a list of selectable payment methods may include an icon for a micropayment processing system 115. The payer 105 may select the micropayment processing system 115. The payer may initiate processing of the micropayment transaction by submitting 210 an identifier, such as, for example and without limitation, an email address, a "user ID," a telephone number and/or any portion thereof. In an embodiment, a "cookie" or other persistent data located on the payer's network access device may relate to such an identifier. If the payer 105 has already established an account with the payment processing system 115, the payer 105 may be directed to the system (or to a location within the payee's website 110 designed to receive information on behalf of the micropayment processing system) to provide 215 a password to authorize payment to the payee. As will be apparent to one with ordinary skill in the art, other authentication methods, such as, without limitation, biometric devices or cryptographic tokens, may be used to authenticate the payer to the micropayment processing system. If the payer has not already established an account with the micropayment processing system 115, the payer 105 may be directed to a registration sub-system in order to initiate 220 an account setup routine.

Upon completion of the account setup routine or once the password is entered or the payer is otherwise authenticated to the micropayment processing system if an account had previously been established, a determination may be made as to whether sufficient value is present to complete the transaction. If not, the payer 105 may select a value source from which funds are received 225 by the micropayment processing system 115. In an embodiment, funds may be received 225 from, for example and without limitation, credit card, debit card, a direct debit from a bank account via, for example, Automated Clearing House (ACH), direct deposit or the like, over the counter to an agent, and/or from a deposited amount. The micropayment processing system 115 may transmit 230 the transaction information supplied by the payer 105 to the acquirer bank 120. The acquirer bank 120 may facilitate an authorization procedure with a direct debit account or the card acquirer. If the payer 105 is authorized, the acquirer bank 120 may confirm 235 the load of value to the micropayment processing system 115, which forwards 240 the confirmation to the payer. Otherwise, the micropayment process may terminate 245. In an alternate embodiment, the payer 105 may be provided with one or more additional opportunities to provide proper authorizing information to the micropayment processing system 115.

Once sufficient value is present to complete the transaction, the micropayment processing system 115 may transfer 250 funds from any payer account to any payee account. In an embodiment, a payer account and a payee account may be attributes of the same account. The micropayment processing system 115 may then notify 255 the payer 105 and the payee 110 that the transaction has successfully completed. The payer 105 may then be returned 260 to the payee website 110.

Figure 3:
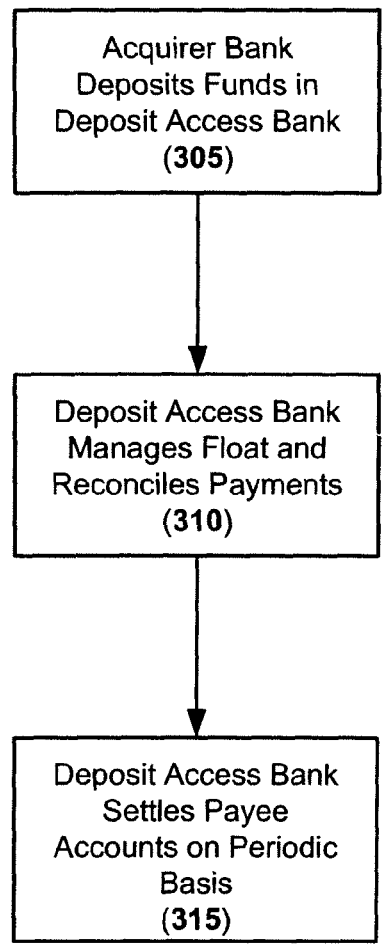
FIG. 3 depicts a flow diagram for an exemplary settlement process for a micropayment processing system according to an embodiment.

FIG. 3 depicts a flow diagram for an exemplary settlement process for a micropayment processing system according to an embodiment. As shown in FIG. 3, the acquirer bank 120 may deposit 305 funds into an account operated by the deposit access bank 135. The deposit access bank 135 may manage the float (float occurs when an account in the system retains a positive balance of funds) and reconcile 310 payments for the micropayment processing system 115. The deposit access bank 135 may settle 315 its account with each payee on, for example, a periodic basis. For example, the deposit access bank 135 may settle 315 its account with each payee on an hourly, daily, weekly or monthly basis. Other settlement periods may also be used within the scope of this disclosure.

Figure 4A:
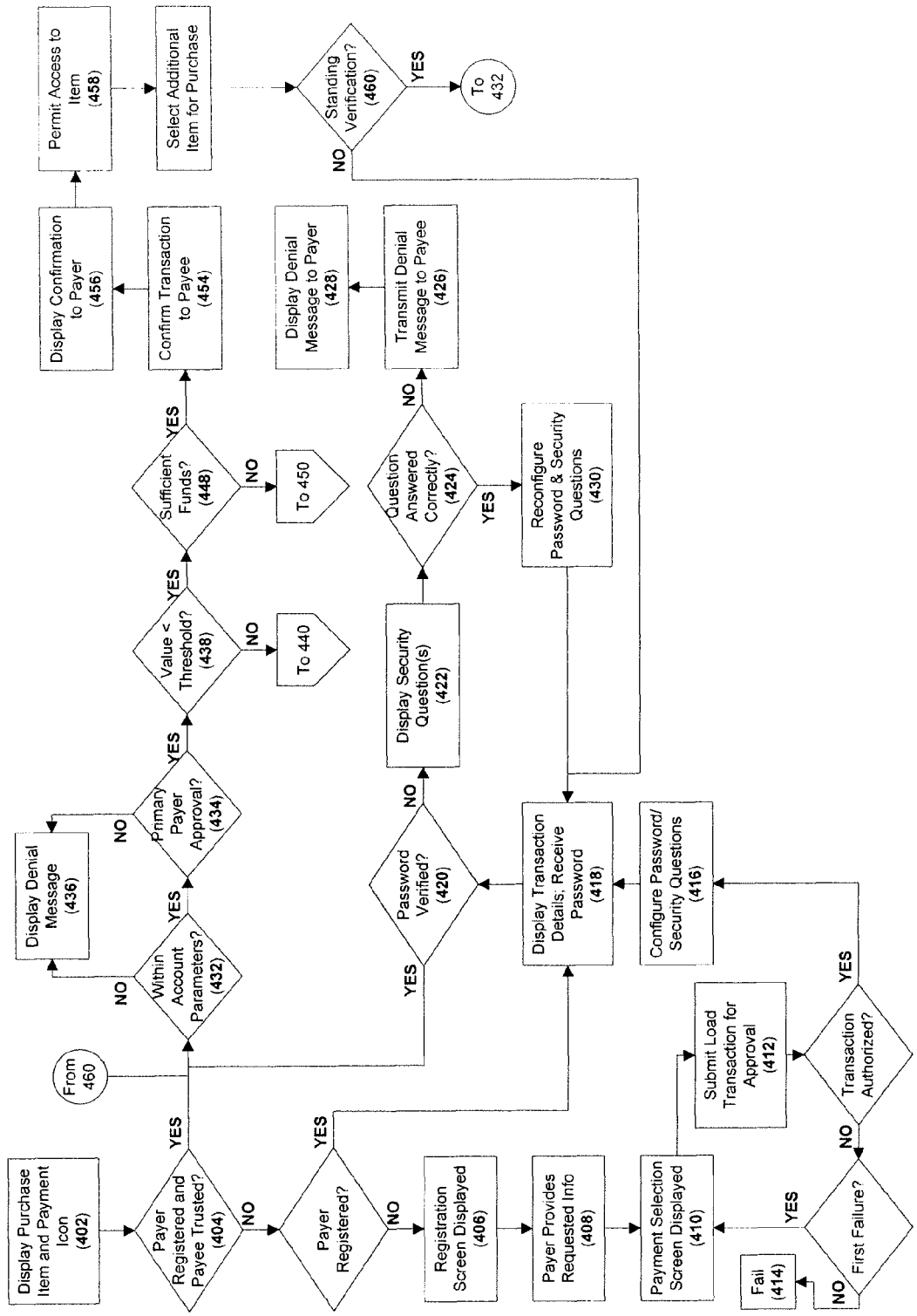
FIGS. 4A and 4B depict a flow diagram for an exemplary micropayment purchase from a payee website according to an embodiment.
Figure 4B:
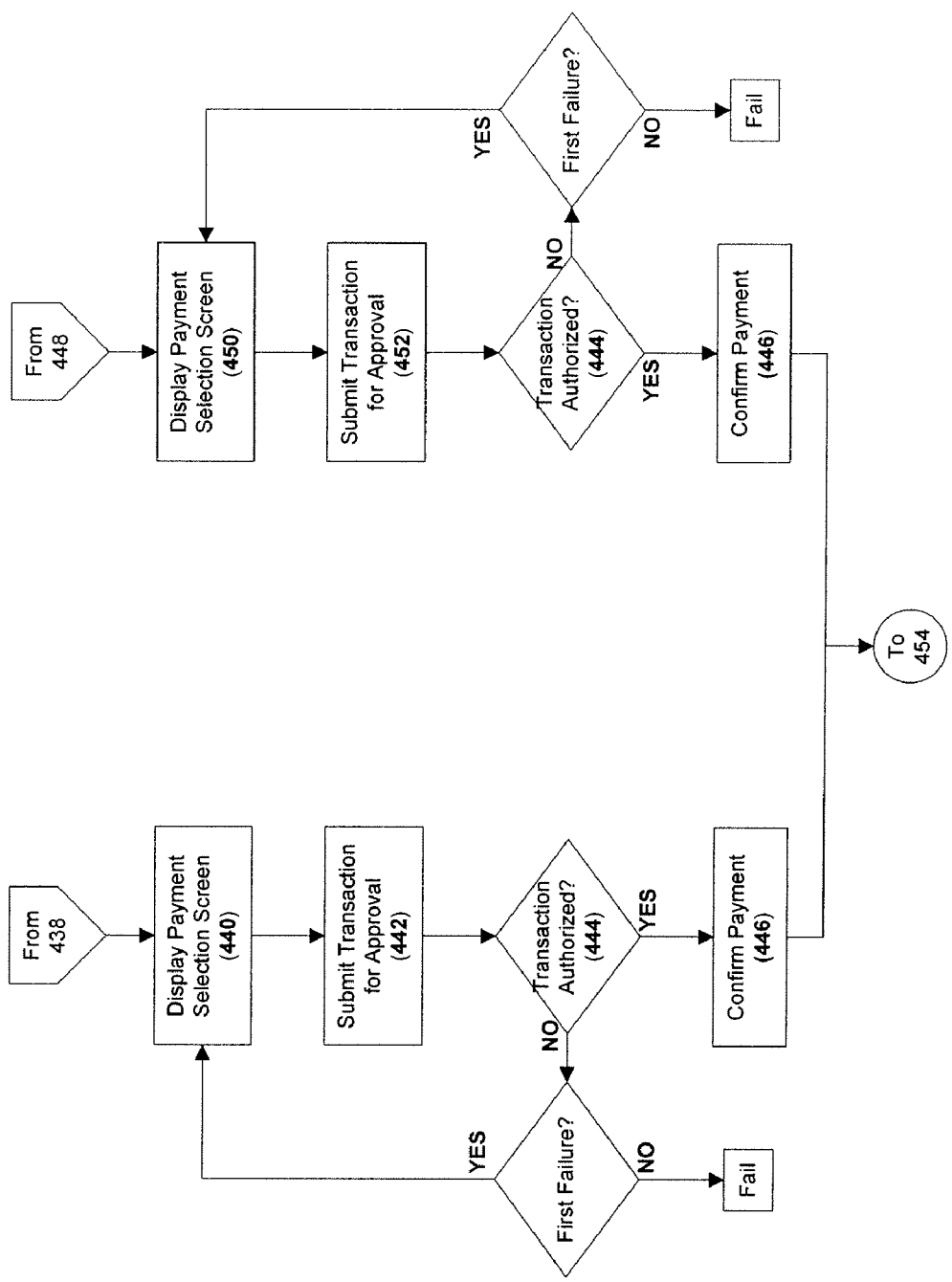

FIGS. 4A and 4B depict a flow diagram for an exemplary micropayment transaction performed on a payee website according to an embodiment. As shown in FIGS. 4A and 4B, a payer may access the payee website via a user interface, such as a web browser. The user interface may display 402 an item or service for purchase to the payer with a message offering the option to pay for the item using a micropayment processing system and a selectable micropayment icon if the item or service has a value below a threshold. In an embodiment, additional information may be displayed 402, such as a link to an information page describing the micropayment processing system. In an embodiment, the micropayment icon may be selected to initiate micropayment transaction processing.

Determinations may be made 404 as to whether the payer has previously registered with the micropayment processing system and whether the payee is a Trusted Merchant. In an embodiment, a payee may be required to submit to a qualifying process to be considered a Trusted Merchant. A payer may further be required to select a payee from a list of payees that have been qualified as Trusted Merchants in order for the payee to be a Trusted Merchant for that payer.

In an embodiment, a payer may elect to have a verification code or token stored as part of the payer's registered profile with a Trusted Merchant. The payer may make this request when interfacing with the Trusted Merchant or with the micropayment processing system (e.g. through Internet Banking or an interface facilitated to the micropayment processing system independent of a transaction by the Trusted Merchant). Upon receipt of a cardholder request, the micropayment processing system may provide a verification code or token to the Trusted Merchant for storage as part of the registered payer's profile. In an embodiment, the verification code or token may be generated in response to the payer's request so that it only verifies transactions by the payer made at the specified Trusted Merchant, may be provided to the Trusted Merchant in a fully encrypted form, and may only be decryptable by the micropayment processing system. In an embodiment, the token may allow session-based authentication. In another embodiment, the token may be used without session-specific authentication. When the payer performs a transaction with the Trusted Merchant, the payee may submit a payment authorization request accompanied by the payer's verification code or token to the micropayment processing system. The micropayment processing system may decrypt the verification code or otherwise verify a token upon receipt of the payment authorization request and provide an appropriate payment authorization response with all necessary data elements. The payee website may receive the payment authorization response and process the response as appropriate. In an embodiment, if the payer has previously registered, the Trusted Merchant may engage in a transaction with the registered payer without resubmitting identifying information for the parties, such as a password, an email address or the like.

If the payer has not previously been registered, a registration screen may be displayed 406 requesting profile information from the payer. For example, the payer may provide a name, address, telephone number, and/or the like. Once the payer provides 408 the requested information, a payment selection screen may then be displayed 410. The payment selection screen may enable the payer to select a payment type, such as a Visa®-branded credit card, the source details for the selected payment type and a load amount. In an embodiment, one or more selections for a load amount may be displayed via a pull-down menu. The micropayment processing system may submit 412 the load transaction to an external authorization service. If the transaction is not authorized, the micropayment processing system may display 410 the payment selection screen again. In an embodiment, if the load transaction fails a second time, the micropayment transaction may fail 414. If the load transaction is authorized, the micropayment payment system may display 416 a load confirmation screen, which requests, for example, a password and selections and answers for, for example, three security questions. It will be apparent to one of ordinary skill in the art that additional or alternate information may be requested from the user within the scope of this disclosure. In addition, an alternate number of security questions, other security verification methodologies and/or load transaction failures may also be included within the scope of this disclosure.

If the payer successfully completes the registration process or if the payer is determined to be registered, but the payee is not a Trusted Merchant, in step 404, the micropayment processing system may display 418 a purchase amount, a name for the payee and a description of the item for purchase. The system may further display 418, for example, a text entry field in which the payer is requested to enter an identifier, such as an email address, and a password corresponding to the entered identifier. A determination may then be made 420 as to whether the entered password corresponds to the identifier. If not, the micropayment processing system may display 422 one or more security questions pre-selected by the payer during the registration process. In an embodiment, the displayed security question may be selected randomly from the pre-selected security questions. The payer's answer to the displayed security question may be compared 424 with the answer provided during registration. If an improper answer is provided, a denial message may be transmitted 426 to the payee. The payee website may then display 428 a message requesting an alternate form of payment from the payer. If the proper answer is provided, the user may reconfigure and confirm 430 the password for the account and alternately select new security questions and responses. The process may then return to step 418.

If the entered password is determined 420 to correspond to the identifier or if the payer is registered and the payee is a Trusted Merchant in step 404, one or more further determinations may be made. For example, a determination may be made 432 as to whether the transaction amount falls within user-defined account parameters. Such parameters may include, for example and without limitation, whether the payee has been allowed and/or blocked, whether a total value limit is satisfied, whether the transaction satisfies value limits for the payee and/or whether the transaction satisfies time limitations for the account. Other account parameters may be defined within the scope of this disclosure on, for example, a per-payer, per-payee and/or per-account basis. Moreover, for transactions made by payers other than the primary payer for an account, a determination may be made 434 as to whether the primary payer has permitted the transaction. For example, a parent may set a limitation on transactions that a child performs using the account, such as the type, dollar amount or the like for such transactions. If any user-defined account parameters and/or primary payer parameter is not satisfied for a transaction, the payee website may display 436 a denial message to the payer and request that an alternate form of payment be selected.

If all parameters are satisfied, a determination as to the relationship between a transaction value and a threshold may be made 438. For example, if the transaction value is greater than and/or equal to a pre-defined threshold, a payment screen may be displayed 440 to the payer. The payment screen may include, for example and without limitation, one or more default payment sources and details, such as a masked account number, for each source. The payer may select a source and the transaction may be submitted 442 for external authorization. If the selected payment source authorizes 444 the transaction, a screen may optionally be displayed 446 to the payer listing, for example, the purchase amount, the payee name, a description of the purchased goods and/or services and the like. The payer may submit the payment without providing additional information.

If the transaction value is less than and/or equal to a pre-defined threshold, a micropayment processing system may be selected for processing the transaction. The micropayment processing system may determine 448 whether sufficient funds remain in the payer's account. If not, the micropayment processing system may display 450 a screen requesting that the payer add additional funds to the account from a default payment source, such as a credit card, a bank account, or the like. In an embodiment, the screen may present the default payment source with masked information, such as the last four digits of a credit card number, bank account number, or the like. In an embodiment, the payer may provide an alternate payment source. In an embodiment, amounts to add to the account may be presented in a pull-down menu or similar method having pre-selected amounts. In an embodiment, the screen may include a text entry field in which the payer may specify a particular amount. Once the payer specifies an amount to add to the account, the micropayment processing system may submit 452 the load transaction for external authorization by the selected payment source. If the selected payment source authorizes 444 the transaction, a screen may optionally be displayed 446 to the payer listing, for example, the purchase amount, the payee name, a description of the purchased goods and/or services and the like. The payer may submit the payment without providing additional information.

If sufficient funds remain in the account or are added to the account, a transaction confirmation may be provided 454 to the payee website. The payee website, upon receipt of the confirmation from the micropayment processing system, may display 456 a confirmation message to the payer and permit 458 access to the goods and/or services. In an embodiment, if the payer desires 460 to purchase additional goods and/or services, the micropayment purchase process for such additional goods and/or services may skip to, for example, step 432. In an embodiment, the micropayment purchase process may skip to step 432 only if the additional goods and/or services are sought to be purchased during a single access session. In an embodiment, a payer may be required to provide a password again if, for example, a payer does not make a purchase within a pre-defined time period of a previous purchase, a payer has accessed a different website or the like. Alternately, the micropayment purchase process may skip to step 432 if the payee is a Trusted Merchant.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

What is claimed is:

1. A method of processing a micropayment transaction between a payer and a payee, the method comprising:
    receiving, by a website, from a user interface, a request to make a purchase of an item or service with a transaction value;
    comparing the transaction value with a pre-defined threshold;
    displaying, by the website on the user interface, different payment source options from which a selection is to be made, wherein if the transaction value is less than the threshold then the payment source options include a micropayment option, and if the transaction value is not less than the threshold then the payment source options do not include a micropayment option, the micropayment option relating to payment for the purchase to be provided by a non-transitory micropayment processing system;
    receiving, by the website from the user interface, a selection of the micropayment option and, in response, sending a payment authorization request to the micropayment processing system;
    receiving the payment authorization request at the micropayment processing system, the payment authorization request including a payer identifier, a transaction amount and an identification of the item or service for purchase;
    the micropayment processing system verifying the payer's identity based at least in part on the payer identifier;
    the micropayment processing system determining whether the payment authorization request satisfies one or more pre-defined account parameters, wherein the one or more pre-defined account parameters are specific to an account associated with the payer identifier;
    the micropayment processing system determining whether the transaction value is less than the pre-defined threshold, wherein access to the micropayment processing system for processing payment authorization requests is restricted to requests for amounts less than the pre-defined threshold;
    the micropayment processing system determining whether the account associated with the payer identifier contains a prefunded account balance greater than or equal to the transaction value;
    the micropayment processing system approving the payment authorization request when the micropayment processing system has determined that the payment authorization request satisfies the one or more pre-defined account parameters, the transaction value is less than the pre-defined threshold, and the account associated with the payer identifier contains the prefunded account balance greater than or equal to the transaction value, and
    the micropayment processing system causing the transaction value to be transferred from the prefunded account balance to a financial account of the payee.

2. The method of claim 1, wherein the payer's identity is verified using a password.

3. The method of claim 1, wherein the payee has no access to said payer identifier.

4. The method of claim 1, wherein said pre-defined threshold is associated with said payee and said payer.

5. The method of claim 1, wherein said pre-defined account parameters comprise one or more of payee value limits, total value limits, time limitations, or whether the payee has been blocked.

6. A method of processing a micropayment transaction between an secondary payer and a payee, the method comprising:
- receiving, by a website, from a user interface, a request to make a purchase of an item or service with a transaction value;
- comparing the transaction value with a pre-defined threshold;
- displaying, by the website on the user interface, different payment source options from which a selection is to be made, wherein if the transaction value is less than the threshold then the payment source options include a micropayment option, and if the transaction value is not less than the threshold then the payment source options do not include a micropayment option, the micropayment option relating to payment for the purchase to be provided by a non-transitory micropayment processing system;
- receiving, by the website from the user interface, a selection of the micropayment option and, in response, sending a payment authorization request to the micropayment processing system;
- receiving the payment authorization request at the micropayment processing system, the payment authorization request including a secondary payer identifier, a transaction amount and an identification of the item or service for purchase;
- the micropayment processing system verifying said secondary payer's identity based at least in part on the secondary payer identifier;
- the micropayment processing system determining whether one or more pre-defined account parameters are satisfied, wherein
  - (i) the one or more pre-defined account parameters are specific to an account associated with the secondary payer identifier,
  - (ii) the account is primarily associated with a primary payer, and
  - (iii) one or more of the parameters apply only to the secondary payer;
- the micropayment processing system determining whether the transaction value that is less than the pre-defined threshold, wherein access to the micropayment processing system for processing payment authorization requests is restricted to requests for amounts less than the pre-defined threshold;
- the micropayment processing system determining whether the account associated with the secondary payer identifier contains a prefunded account balance greater than or equal to the transaction value; and
- the micropayment processing system approving the payment authorization request when the micropayment processing system has determined that the payment authorization request satisfies the one or more pre-defined account parameters, the transaction value is less than the pre-defined threshold, and the account associated with the payer identifier contains the prefunded account balance greater than or equal to the transaction value, and
- the micropayment processing system causing the transaction value to be transferred from the prefunded account balance to a financial account of the payee.

7. The method of claim 6, wherein the secondary payer's identity is verified using a password.

8. The method of claim 6, wherein said pre-defined threshold is associated with said payee and said secondary payer.

9. The method of claim 6, wherein said pre-defined threshold is associated with said secondary payer.

10. The method of claim 6, wherein said primary payer is a parent or guardian, and said secondary payer is a child.

11. The method of claim 1, further comprising:
- the micropayment processing system requesting and receiving approval for the payment authorization request from an account funding source identified in the account associated with the payer identifier prior to approving the payment authorization request, when the transaction value is more than the prefunded account balance.

12. A method of processing a micropayment transaction between a payer and a payee using a micropayment processing system, comprising:
- receiving, by a website, from a user interface, a request to make a purchase of an item or service with a transaction value;
- comparing the transaction value with a pre-defined threshold;
- displaying, by the website on the user interface, different payment source options from which a selection is to be made, wherein if the transaction value is less than the threshold then the payment source options include a micropayment option, and if the transaction value is not less than the threshold then the payment source options do not include a micropayment option, the micropayment option relating to payment for the purchase to be provided by a non-transitory micropayment processing system;
- receiving, by the website from the user interface, a selection of the micropayment option and, in response, sending a payment authorization request to the micropayment processing system;
- receiving the payment authorization request at the micropayment processing system, the payment authorization request including a payer identifier, a transaction amount, and an identification of the item or service for purchase;
- verifying the payer's identity based at least in part on the payer identifier received by the micropayment processing system;
- the micropayment processing system determining if the payment authorization request qualifies as a micropayment transaction based on the transaction amount, wherein a payment authorization request qualifies as a micropayment transaction if the transaction amount is less than the pre-determined micropayment threshold, and wherein access to the micropayment processing system for processing payment authorization requests is restricted to requests that qualify as a micropayment transactions;
- determining whether an account associated with the payer at the micropayment processing system contains a prefunded account balance greater than or equal to the transaction value; and
- the micropayment processing system approving the payment authorization request when the micropayment processing system has determined that the payment authorization request satisfies the one or more pre-defined account parameters, the transaction value is less than the pre-defined threshold, and the account associated with the payer identifier contains the prefunded account balance greater than or equal to the transaction value, and the micropayment processing system causing the transaction value to be transferred from the prefunded account balance to a financial account of the payee.

13. The method of claim 12, further comprising:

the micropayment processing system requesting and receiving approval for the payment authorization request from an account funding source identified in the account associated with the payer identifier prior to approving the payment authorization request, when the transaction value is more than the prefunded account balance.

* * * * *